United States Patent [19]

Haeberli et al.

[11] Patent Number: 5,438,429
[45] Date of Patent: Aug. 1, 1995

[54] DIGITAL FILTERING FOR LENTICULAR PRINTING

[75] Inventors: Paul E. Haeberli, Menlo Park; Leonard J. Flory, Sacramento, both of Calif.

[73] Assignee: Silicon Graphics, Inc., Mountain View, Calif.

[21] Appl. No.: 148,086

[22] Filed: Nov. 4, 1993

Related U.S. Application Data

[63] Continuation of Ser. No. 751,033, Aug. 28, 1991.

[51] Int. Cl.⁶ .............................................. H04N 1/40
[52] U.S. Cl. .................................................. 358/445
[58] Field of Search .................. 355/22; 358/448, 444, 358/452, 500

[56] References Cited

U.S. PATENT DOCUMENTS

| | | | |
|---|---|---|---|
| 4,954,912 | 9/1990 | MacDonald et al. | 358/448 |
| 5,113,213 | 5/1992 | Sandor et al. | 355/22 |

OTHER PUBLICATIONS

Minami et al., "Three-Dimensional Image Reconstruction from the Projections under Limited View Angle", Systems Computers Controls, vol. 10, No. 4, Aug. 1979, pp. 58-68.

*Primary Examiner*—Edward L. Coles, Sr.
*Assistant Examiner*—Jerome Grant, II
*Attorney, Agent, or Firm*—Skjerven, Morrill, MacPherson, Franklin & Friel; Alan H. MacPherson; Omkar K. Suryadevara

[57] ABSTRACT

A method is provided which sharpens three-dimensional images by using an unsharp masking technique subsequent to interleaving and before printing.

9 Claims, 3 Drawing Sheets

Microfiche Appendix Included
(106 Microfiche, 2 Pages)

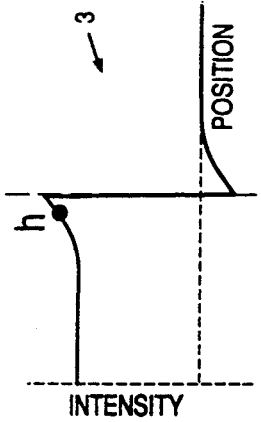
FIG. 3
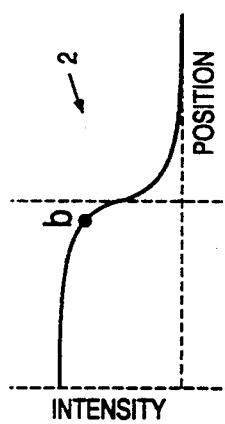
FIG. 2
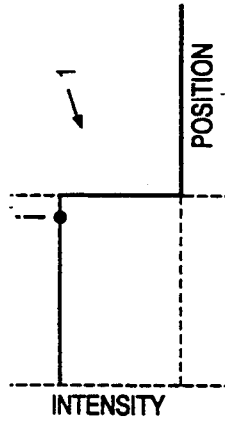
FIG. 1
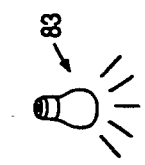
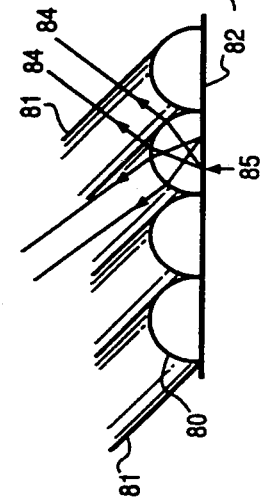
FIG. 8
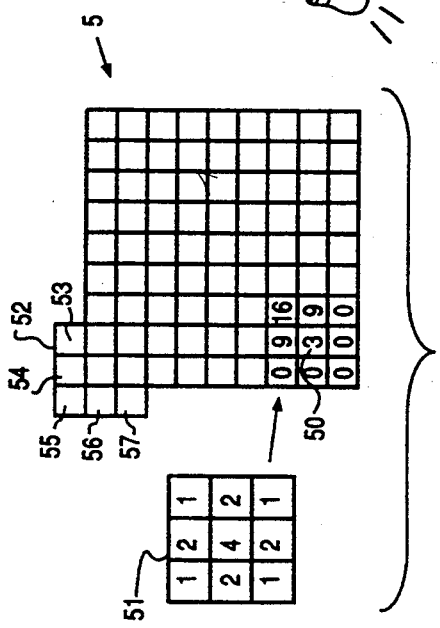
FIG. 5
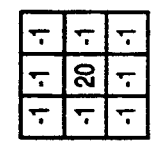
FIG. 7
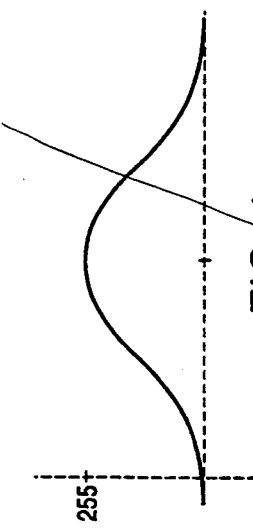
FIG. 4
FIG. 6

| K | 1 | 2 | 4 | 2 | 1 |
|---|---|---|---|---|---|

| $K_b$ | 1/10 | 2/10 | 4/10 | 2/10 | 1/10 |
|---|---|---|---|---|---|
| | $b_0$ | $b_1$ | $b_2$ | $b_3$ | $b_4$ |

| $K_i$ | 0 | 0 | 1 | 0 | 0 |
|---|---|---|---|---|---|
| | $i_0$ | $i_1$ | $i_2$ | $i_3$ | $i_4$ |

| $K_h$ | -1/10 | -2/10 | 6/10 | -2/10 | -1/10 |
|---|---|---|---|---|---|
| | $h_0$ | $h_1$ | $h_2$ | $h_3$ | $h_4$ |

FIG. 9

DIGITAL FILTERING FOR LENTICULAR PRINTING

This application is a continuation of application Ser. No. 07/751,033, filed Aug. 28, 1991.

CROSS REFERENCE TO MICROFICHE APPENDIX

Appendix A, which is a part of the present disclosure, is a microfiche appendix consisting of 2 sheets of microfiche having a total of 106 frames. Microfiche Appendix A is a listing of computer programs and related data in one embodiment of this invention, which is described more completely below.

A portion of the disclosure of this patent document contains material which is subject to copyright protection. The copyright owner has no objection to the facsimile reproduction by anyone of the patent document or the patent disclosure, as it appears in the Patent and trademark Office patent files or records, but otherwise reserves all copyright rights whatsoever.

FIELD OF THE INVENTION

This invention relates to three-dimensional or stereoscopic hardcopies, and in particular to a filtering process done after interleaving strips of the image so as to ensure a sharper final image.

BACKGROUND OF THE INVENTION

Producing three-dimensional hardcopies using a computer is well known in the art. To do this, a three-dimensional image is printed on a planer sheet in two dimensions, but a viewer, under certain circumstances, perceives the image as three-dimensional. For example, an article by Daniel J. Sandin et al., "Computer Generated Barrier Strip Autostereography" presented at the Symposium on Electronic Imaging (SEI) in 1989 discusses the computer graphics transformations necessary to produce three-dimensional images for lenticular systems and computational processes to combine different views onto a three-dimensional image. A lenticular system typically includes a sheet of cylindrical lenses, called lenticules (described below), positioned on a flat picture at the focal plane of the lenses. The Sandin reference teaches that by connecting a computer to a high-resolution output scanner, computer-based images, i.e. images designed using a computer, and digitized camera images, i.e. images created with the use of a camera and digitized by a computer, can be automatically combined and printed on transparency film.

In addition to generating images for three-dimensional transformation by the computer, such images can be input into the computer using video cameras or image scanners. In either method, a spatial sequence of frames is automatically digitized and stored by the computer as seen in step 100 of FIG. 10. A particular point common to all the frames, for example point 108 in step 101, the center of depth, is determined. The distance between the origin of a coordinate system and the same image point on two simultaneous frames determines the degree of motion. Referring to step 101, point 108 on ball 109 appears on the left of frame 106 and on the right in frame 107. Hence, ball 109 is interpreted by the computer as "moving" from the left to the right.

Subsequent off-axis perspective projections of the image are done to the right and left from this center of depth as indicated in step 102. The degree of off-axis projection determines the depth an observer sees when viewing the hardcopy. The computer requires at least two images from different perspectives to provide a hardcopy which creates the illusion of three-dimensional vision. The more image data provided to the computer, the better the resulting "three-dimensional" hardcopy.

Once a graphical model is developed, the computer's software allows the viewer to determine the desired viewing angle by rotating the image on a CRT monitor until an angle is found that is aesthetically pleasing. Depth information is also determined by the viewer at this time. To give the illusion of depth, an off-axis perspective projection of the image is created both to the left and to the right about its center of depth. The degree of off-axis projection determines the depth an observer sees when viewing the resulting hardcopy. The resulting images are then stored for subsequent processing as indicated in step 103. The computer converts these images into alternating, thin vertical strips in a process called "interleaving". A composite is formed of these thin interleaved strips. For example, as shown in step 104, if three images from different perspectives were provided, a composite of these images would begin with a Strip from the first image A, then the second image B, and finally the third image C. This sequence would be repeated until all three images were totally interleaved. A typical composite may have ten images interleaved.

The composite information is fed to a hardcopy output device, such as a laser printer, which is indicated in step 105. The composite information is printed as an interleaved image on standard paper and then laminated with a lenticular screen. A typical lenticular surface, shown in FIG. 8, consists of narrow (generally less than 0.3 mm), cylindrical plastic lenses 80, called lenticules, which run parallel to the vertical sides 81 of the interleaved image surface 82.

Lenticule 80 ensures that light from source 83 scattered from any point, for example point 85, on the interleaved image surface 82 is parallel. The direction that light emerges, see light rays 84, from the lenticule 80 depends on the location of the point of reflection, i.e. point 85, on the interleaved image plane 82. In this manner, multiple images may be seen depending on the viewing angle. The number of images seen in the hardcopy corresponds to the number of images interleaved to form the composite.

However, because of inherent distortions or inaccuracies in lenticular lenses, images previously produced using stereoscopic methods have yielded blurred images.

SUMMARY OF THE INVENTION

A method of producing enhanced three-dimensional hardcopy images includes digitizing and storing images captured as a plurality of frames generated by a computer or input into a computer using video cameras or image scanners. A common point to this plurality of frames is determined. Using this common point, multiple images are created from off-axis perspective projections. After storing these images, a composite is formed by interleaving. An unsharp masking technique is used on the composite to produce a sharper image. Specifically, an image represented by a waveform (which can be represented discretely as a plurality of values) is initially blurred a predetermined amount. This blurred image, also represented by a waveform (which can also be represented discretely by a plurality of values), in conjunction with the waveform of the original image and a blending factor, are input into an equation which results in the final image having enhanced, or accentuated, edges. These sharper images are printed out in hardcopy and laminated to a lenticular surface to create a three-dimensional effect in the mind of the viewer. Using this method, a sharper image is produced which provides greater realism to the viewer, thereby significantly increasing the viewer's visual pleasure.

DESCRIPTION OF THE DRAWINGS

FIG. 1 illustrates a typical signal representing an identified edge in an image.

FIG. 2 shows the signal of FIG. 1 which is blurred using a low-pass filter.

FIG. 3 illustrates the signal of FIG. 2 transformed by high-pass filtering.

FIG. 4 shows an illustrative Gaussian-shape curve to be convolved with an input signal to produce a blurred image.

FIG. 5 illustrates a typical filter kernel used to produce a low-pass signal.

FIG. 6 shows an illustrative curve representing the function to be convolved with a blurred signal to produce a high-pass signal.

FIG. 7 illustrates a typical high-pass filter kernel.

FIG. 8 shows a typical lenticular surface with lenticules running parallel to the vertical sides of the image.

FIG. 9 shows the derivation of an unsharp masking kernel.

DETAILED DESCRIPTION OF THE DRAWINGS

Figure 10:
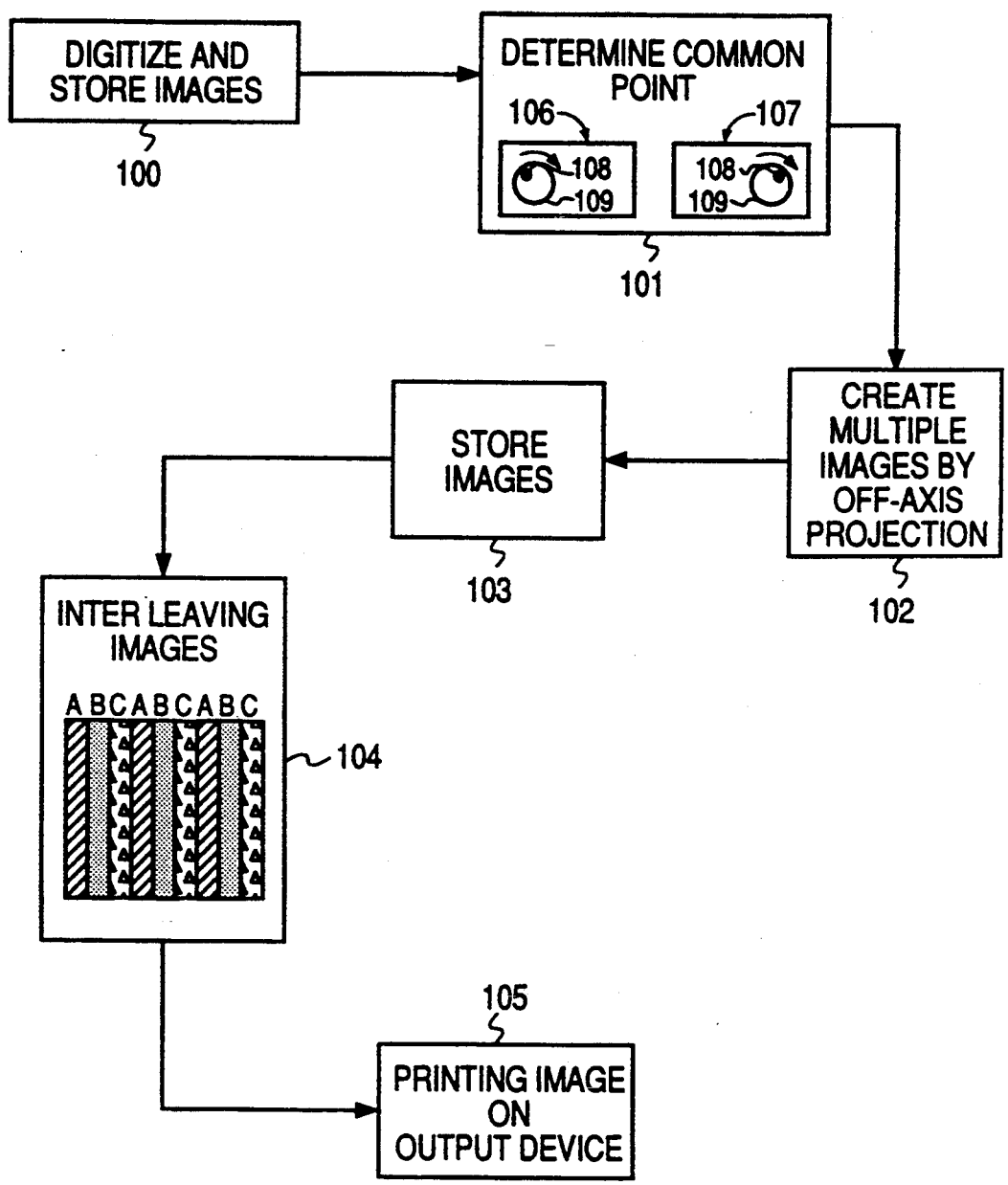
FIG. 10 illustrates a prior art method of producing three-dimensional hard copies.

A sharp image is characterized by having well-defined edges. In contrast, a blurred image has less well-defined edges. It is desirable to have as sharp an image as possible to enhance the clarity of the image perceived by the viewer. To do this, a technique known as unsharp masking is employed. Unsharp masking involves initially blurring the original image, which is represented by a plurality of values on a waveform, by a predetermined amount. This blurred image, also represented by a plurality of values on a waveform, together with the waveform of the original image and a blending factor, are input into an equation further described in detail below which provides a resulting image having enhanced, or accentuated, edges. Blurring of the original image eliminates some edges which normally define an object as seen by the eye. Therefore, if a blurred image is subtracted from the original image, the resulting image with "enhanced" edges has more easily identifiable edges than the original image.

Enhanced edges, although not providing additional information to a representation of an image, do increase the dynamic range of the image's features which allow the eye to more easily identify those features, thereby creating more human interest in the representation of the object.

In accordance with the present invention, an unsharp masking technique is used subsequent to the interleaving step, thereby producing sharper and more interesting three-dimensional images. All other steps used in the present invention in producing the three-dimensional images are as described above.

In an unsharp masking process, a signal proportional to the unsharp, or low-pass filtered, version of the image is subtracted from the image. This is equivalent to adding the gradient, or a high-pass signal, to the image. An example of unsharp masking follows.

An image is represented by light, i.e. the intensity of the light and the frequency of the light, both of which may vary as a function of location. An edge of an image is where the intensity and/or color of the light changes. Assume an edge in an image is identified and sent through a filter which creates a signal I shown in FIG. 1. The waveform which graphically represents this signal has a light intensity (brightness) which is a function of position. Signal 1 is then passed through a low-pass filter, thereby producing a blurred image represented by signal 2 shown in FIG. 2. Unsharp masking is accomplished by modifying the value i of the image at each spatial location or "pixel" in accordance with the following equation:

$$h = (1-a) \times i + (a \times b) \qquad (1)$$

where i is the particular intensity value of the image on the waveform at a particular location along the horizontal axis as illustrated in FIG. 1, b is the value of the corresponding point along the horizontal axis on the waveform 2 representing the blurred image shown in FIG. 2, "a" is a blending factor, and h is the value of the corresponding point on the waveform 3 of the high-pass signal representing the modified image as illustrated in FIG. 3.

Referring to equation (1) shown above, if blending factor a is equal to zero, then h will equal i. In other words, the resulting image will be identical to that of the original. On the other hand, if blending factor a is "1", then the resulting image will be identical to the blurred image as shown in FIG. 2. Because blending factor a is multiplied by b, the value on waveform 2, the larger the magnitude of blending factor a, the more blurred the image becomes. The more negative the blending factor a, the more accentuated the peaks of waveform 3 are in FIG. 3, thereby creating a sharper final image. One embodiment of the present invention uses a blending factor of −0.2 which was determined by experimental results to maximize viewer interest in the resulting image.

Therefore, two parameters directly affect the sharpness of the final image: the blurriness, i.e., slope of the waveform 2, and the blending factor a. Both of these parameters will now be discussed in further detail.

The signal in FIG. 2 is created by convolving signal 1 of FIG. 1 with a Gaussian-shaped curve, as illustrated, for example, in FIG. 4. Convolving, as used in computer graphics, defines a way of combining discrete functions as represented, for example, in FIGS. 1 and 4. Values on the Gaussian curve shown in FIG. 4 vary from zero to 255 and represent the filter kernel to be used on the image. A filter kernel is a matrix of light intensity values to, in effect, change an original image by mathematical processes. Specifically, the filter kernel either accentuates or demphasizes intensity values in an image by using a method described in detail below in reference to FIG. 5.

In accordance with the present invention, kernels in a single line (i.e., one pixel high) are used to scan the interleaved image. The filter kernel which provides unsharp masking is derived in the following manner. Assume the values on the Gaussian curve are represented by kernel k shown in FIG. 9. To derive the unsharp masking kernel, the blurring kernel and associated input kernel must be normalized (i.e., all values when summed will equal one). This normalization yields blurred kernel $k_b$ where $b_0=1/10$, $b_1=2/10$, $b_4=$, $b_3=2/10$, and $b_4=1/10$) and input kernel $k_m$ (where by definition the image is made up of a plurality of pixels and the five pixels corresponding in location to the filter coefficients are $i_0$, $i_1=0$, $i_2=1$, $i_j=0$, and $i_4=0$).

If blending factor a is equal to $-1.0$, then using equation 1 above yields unsharp masking kernel $k_h$ (where $h_0=-1/10$, $h_1=-2/10$, $h_2=6/10$, $h_3=-2/10$, and $h_4=-1/10$). Thus, for any blending factor a, the unsharp masking kernel is generally defined as:

$$k_h = (1-a) \times k_i + a \times k_b \quad (2)$$

A 3×3 filter kernel 51 is shown in FIG. 5 superimposed over a 9 pixel by 9 pixel image 5. Each pixel has a shade value between 0 and 255 (see explanation of FIG. 4 for additional reference). A typical image would have 1000 pixels per inch. Each pixel on image 5 under filter kernel 51, for example, the intensity value of pixel 50, is multiplied by a respective weighted value in filter kernel 51. In this example, the intensity value of pixel 50, "3", would be multiplied by "4". All resulting values are added, then divided by the sum of pixel values. (From row to row, top to bottom; $((1(0)+2(9)+1(16)+2(0)+4(3)+2(9)+1(0)+2(0)+1(0))+(1+2+1+2+4+2+1+2+1))$. This procedure yields the new intensity value of "4" for center pixel 50. The computer stores this value for future reference and then moves the kernel over one pixel to determine a new value. This continues until all pixels on image 5 have been evaluated and assigned a value. The user decides how to evaluate edge conditions when the filter kernel 51 extends beyond the physical boundary of image 5 (see filter kernel 52). In one embodiment of the present invention, pixels 53–57 are assumed to be black, i.e. have a shade or intensity value of zero. Note that consistency rather than the value itself is important in handling edges.

FIG. 6 shows an illustrative function curve 6 to be convolved with signal 2, shown in FIG. 2, to produce a high-pass signal 3 shown in FIG. 3. One example of a high-pass filter kernel 7 is shown in FIG. 7. Note that a low-pass filter, for example, filter kernel 51 shown in FIG. 5, has positive values, while a high-pass filter, see FIG. 7, also has negative values. High-pass filter kernel 7, in essence, subtracts whatever brightness the neighboring pixels have, thereby accentuating the center pixel.

The present invention is aided by the use of a computer program which facilitates convolving the input and blurred images. The computer program, shown in Appendix I, is written in C programming language and may be run on any workstation. Although the computer program greatly reduces the time necessary to perform unsharp masking, the present invention is readily implemented without the use of the program.

The preceding description is meant to be illustrative only and not limiting. Those skilled in the art will be able to apply other methods in accordance with this invention based on the appended claims.

We claim:

1. A method of producing a composite hardcopy comprising:
    digitizing and storing a plurality of generated images captured on frames;
    determining a common point to said plurality of frames;
    creating multiple images from off-axis perspective projections using said common point;
    storing said images;
    splitting each image into a plurality of strips;
    interleaving said plurality of strips to form a composite of interleaved strips such that when viewed by a person a three dimensional image is formed in the mind of said person;
    performing an unsharp masking technique on said composite of interleaved strips to produce a sharper image composite;
    printing said sharper image composite using a hard copy output device; and
    laminating said sharper image composite onto a lenticular surface.

2. A method of producing a composite hardcopy to be implemented using a computer comprising:
    digitizing and storing a plurality of generated images captured on frames;
    determining a common point to said plurality of frames;
    creating multiple images from off-axis perspective projections using said common point;
    storing said images;
    splitting each image into a plurality of strips;
    interleaving said plurality of strips to form a composite of interleaved strips such that when viewed by a person a three dimensional image is formed in the mind of said person;
    performing an unsharp masking technique on said composite of interleaved strips to produce a sharper composite image; and
    printing said sharper composite image using a hard copy output device.

3. A method of producing a high resolution hardcopy image on a lenticular surface comprising:
    providing a plurality of images;
    splitting each image into a plurality of strips;
    interleaving said plurality of strips to form a composite of interleaved strips such that when viewed by a person a three dimensional image is formed in the mind of said person; and
    performing an unsharp masking technique on said composite of interleaved strips;
    wherein said unsharp masking technique is implemented by the equation $$h = (1-a) \times i + (a \times b)$$

where "i" is a predetermined intensity value on a first waveform representing an original image, "b" is an intensity value corresponding to said "i" on a second waveform representing a blurred image of said original image, "a" is a blending factor, "h" is a resulting intensity value corresponding to said "i" and said "b" on a third waveform representing said image having shared edges.

4. The method of claim 3 wherein said unsharp masking technique comprises a blurring step that uses a filter kernel, wherein said filter kernel is one pixel high.

5. The method of claim 4 wherein a blurred kernel and an input kernel are derived from said filter kernel.

6. The method of claim 5 wherein said blurred kernel and said input kernel are normalized.

7. The method of claim 3 wherein "a" is negative.

8. The method of claim 7 wherein "a" is approximately $-0.2$.

9. The method of claim 3 wherein each image has a different perspective from every other image.

* * * * *